(12) United States Patent
Arnold

(10) Patent No.: US 6,445,743 B1
(45) Date of Patent: Sep. 3, 2002

(54) TRANSMITTING-RECEIVING STATION HAVING IMPEDANCE-MATCHED RECEIVING MEANS FOR TRANSPONDER ANSWER SIGNALS

(75) Inventor: Siegfried Arnold, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/248,234

(22) Filed: Feb. 11, 1999

(30) Foreign Application Priority Data

Feb. 17, 1998 (EP) .............................. 98890046

(51) Int. Cl.$^7$ ................................. H04B 3/00
(52) U.S. Cl. ..................... 375/257; 375/219; 455/41
(58) Field of Search ................... 375/219, 257, 375/258, 259; 235/375, 380, 492; 340/10.1; 455/39, 41

(56) References Cited

U.S. PATENT DOCUMENTS

| 4,845,347 A | * | 7/1989 | McCrindle et al. | ......... | 235/380 |
| 5,241,160 A | * | 8/1993 | Bashan et al. | ............... | 235/380 |
| 5,519,729 A | * | 5/1996 | Jurisch et al. | ............... | 375/259 |
| 6,021,951 A | * | 2/2000 | Nishikawa | .................. | 235/494 |
| 6,161,762 A | * | 12/2000 | Bashan et al. | ............... | 235/492 |
| 6,202,927 B1 | * | 3/2001 | Bashan et al. | ............... | 235/451 |
| 6,234,902 B1 | * | 5/2001 | Hazama | ....................... | 463/43 |
| 6,324,211 B1 | * | 11/2001 | Ovard et al. | ................ | 375/219 |

FOREIGN PATENT DOCUMENTS

EP     0492569 A2     1/1992     ............ G06K/7/08

* cited by examiner

Primary Examiner—Stephen Chin
Assistant Examiner—Chieh M. Fan
(74) Attorney, Agent, or Firm—Harold Tsiang

(57) ABSTRACT

A transmitting/receiving station is operable in a transmitting mode and a receiving mode. The transmitting/receiving station has a transmission coil circuit with a transmission coil and conductor having a given characteristic impedance, a first end, and a second end. The conductor has its second end connected to the transmission coil circuit and has its first end connected to transmitter means for generation of a request signal and to receiver for receiving an answer signal. Additional circuits are provided in order to guarantee that the first end of the conductor has a matched termination during the receiving mode.

6 Claims, 1 Drawing Sheet

TRANSMITTING-RECEIVING STATION HAVING IMPEDANCE-MATCHED RECEIVING MEANS FOR TRANSPONDER ANSWER SIGNALS

BACKGROUND OF THE INVENTION

1. Field of the Invention

The invention relates to a transmitting/receiving station which is constructed to cooperate with at least one transponder and by means of a which a transmitting mode and a receiving mode can be carried out and which includes the means specified hereinafter, i.e. a transmission coil circuit comprising a transmission coil for the communication with a transponder transmission coil provided in a transponder, conductor means having a given characteristic impedance, which conductor means have a first end and a second end and are connected to the transmission coil circuit at the location of their second end, transmitting means which are constructed to generate a request signal which in a transmitting mode can be transmitted by the transmission coil and can be received by a transponder and which are connected to the conductor means at the location of the first end of the conductor means, and receiving means which are constructed to receive an answer signal produced in the transmitting/receiving station by a transponder in response to a request signal received by it and which are also connected to the conductor means at the location of the first end of the conductor means.

2. Description of the Related Art

Such a transmitting/receiving station of the type defined in the opening paragraph is known from the document EP 0 492 569 A2. In the known transmitting/receiving station care has been taken that in a transmitting mode the transmitting means transmit a request signal with a maximal energy content is transmitted to the transmission coil circuit and eventually to the transmission coil in order to enable a request signal with a maximal energy content to be transmitted to a transponder situated within the receiving range of the transmitting/receiving station. For this purpose the known transmitting/receiving station has an impedance matching network arranged between the conductor means, which are formed by a coaxial cable having a given characteristic impedance, and the transmission coil, as a result of which substantially no undesired reflections occur at the location of the second end of the conductor means, which reflections could give rise to a reduction of the energy content of the request signal transmitted to the transmission coil. In order to enable a request signal having a maximal energy content to be fed into the conductor means by the transmitting means, it is customary in such a known transmitting/receiving station to assure that the internal resistance and hence the output impedance of the transmitting means differs distinctly from the characteristic impedance or surge impedance of the conductor means, so that the internal resistance of the transmitting means causes only insignificant losses of the energy content of a request signal.

In the known transmitting/receiving station the transmitting means as well as the receiving means are connected to the conductor means at the location of the first end of the conductor means, respectively in order to generate a request signal and to receive an answer signal. Owing to this configuration the problem arises that for an answer signal produced in the transmitting/receiving station and transmitted from the transmission coil to the receiving means via the conductor means a rather unfavorable impedance mismatch exists between the conductor means and the receiving means, as a result of which strongly varying matching conditions occur at the second end of the conductor means, i.e. at the end near the transmission coil, as a function of the instantaneous conductor length of the conductor means, which in its turn results in the input resistance, seen by the transmission coil via the matching network, in the conductor means at the location of the second conductor means depends strongly on the conductor length of the conductor means, so that strongly varying attenuation conditions for the answer signal produced in the transmitting/receiving station occur at the location of the second end of the conductor means. Ultimately, these unfavorable conditions have the adverse effect that an answer signal - produced in the transmitting/receiving station by a transponder which communicates with this station - can only be received in an unsatisfactory manner by the receiving means, which is unfavorable for a reliable and correct communication of the transmitting/receiving station with transponders and which is therefore undesirable.

SUMMARY OF THE INVENTION

It is an object of the invention to preclude the aforementioned problems and to provide an improved transmitting/receiving station which guarantees improved reception characteristics.

According to the invention, in order to achieve the aforementioned object in a transmitting/receiving station of the type defined in the opening paragraph, additional means are interposed between the transmitting means and the receiving means and the first end of the conductor means, by which additional means the transmitting means and the receiving means are connected to the first end of the conductor means and by which additional means the first end of the conductor means has a matched termination for an answer signal produced in the transmitting/receiving station.

With simple means and only comparatively low additional expense the measures in accordance with the invention yield the great advantage that always the same good receiving conditions, which remain always constant and are independent of the conductor length of the conductor means, are obtained for an answer signal produced in a transmitting/receiving station in accordance with the invention by a transponder. This guarantees that the receiving means of a transmitting/receiving station in accordance with the invention are practically always supplied with an answer signal having a comparatively high energy content, which is advantageous for an error-free and correct processing of such an answer signal. The reception of an answer signal having a comparatively high energy content by the receiving means is of great importance because an answer signal produced in a transmitting/receiving station by a transponder lies within a range of a distinctly lower amplitudes in relation to a request signal, as a result of which amplitude losses are particularly unfavorable. The measures in accordance with the invention have the advantage that they enable the use of conductor means having a conductor length which is distinctly higher than a quarter of the wavelength of a carrier signal used in a transmitting/receiving station in accordance with the invention.

A transmitting/receiving station in accordance with the invention having the characteristic features defined in the independent Claim 1 may include additional means of a more intricate and therefore comparatively expensive construction. However, in this respect it has proved to be advantageous in a transmitting/receiving station in accordance with the invention having the characteristic features defined in the independent claim 1 if the measures defined in the dependent claim 2 are taken. This yields the advantage of a low-cost construction realized by a minimal number of means which are as simple as possible.

In a transmitting/receiving station having the characteristic features defined in the dependent claim 2 it has proved to be advantageous if, in addition, the measures defined in the dependent claim 3 are taken. Such an embodiment has proved to be particularly advantageous in practice and is moreover particularly simple.

In a transmitting/receiving station having the characteristic features defined in the dependent claim 2 it has proved to be advantageous if, in addition, the measures defined in the dependent claim 4 are taken. Thus, it is achieved in a simple manner that by a suitable choice of the numbers of turns of the transformer coils the determinative resistances of the transmitting means and the receiving means as well as the conductor means can simply be matched to one another and can thus be chosen from comparatively wide ranges. Moreover, it is thus achieved that the values of the components of the filter means can be selected from ranges which are favorable in view of a simple circuit design and a low-cost and problem-free implementation. It is to be noted that the measures defined in the dependent claim 4 can also be applied advantageously in a transmitting/receiving station having the characteristic features defined in claim 3.

In a transmitting/receiving station having the characteristic features defined in the dependent claim 4 it has proved to be very advantageous if, in addition, the measures defined in the dependent claim 5 are taken. Thus, the advantages of the use of a ferrite core in a matching transformer, which advantages are known per se, are also obtained in a transmitting/receiving station in accordance with the invention, which advantageously results in an intimate inductive coupling between the three transformer coils.

In a transmitting/receiving station having the characteristic features defined in the dependent claim 4 it has further proved to be advantageous if, in addition, the measures defined in the dependent claim 6 are taken. Thus, the advantages of the use of a such compensating capacitors, which are known per se, are also obtained in a transmitting/ receiving station in accordance with the invention, in which the effect of such compensating capacitors has proved to be particularly useful. It is to be noted that the measures defined in the dependent claim 6 can also be applied advantageously in a transmitting/receiving station having the characteristic features defined in claim 5.

The afore-mentioned aspects as well as further aspects of the invention will be apparent from the embodiments described hereinafter by way of examples and will be elucidated with reference to these embodiments.

BRIEF DESCRIPTION OF THE DRAWING

The invention will now be described in more detail with reference to two embodiments shown in the drawings and given by way of examples, but to which the invention is not limited.

DETAILED DESCRIPTION OF THE INVENTION

Figure 1:
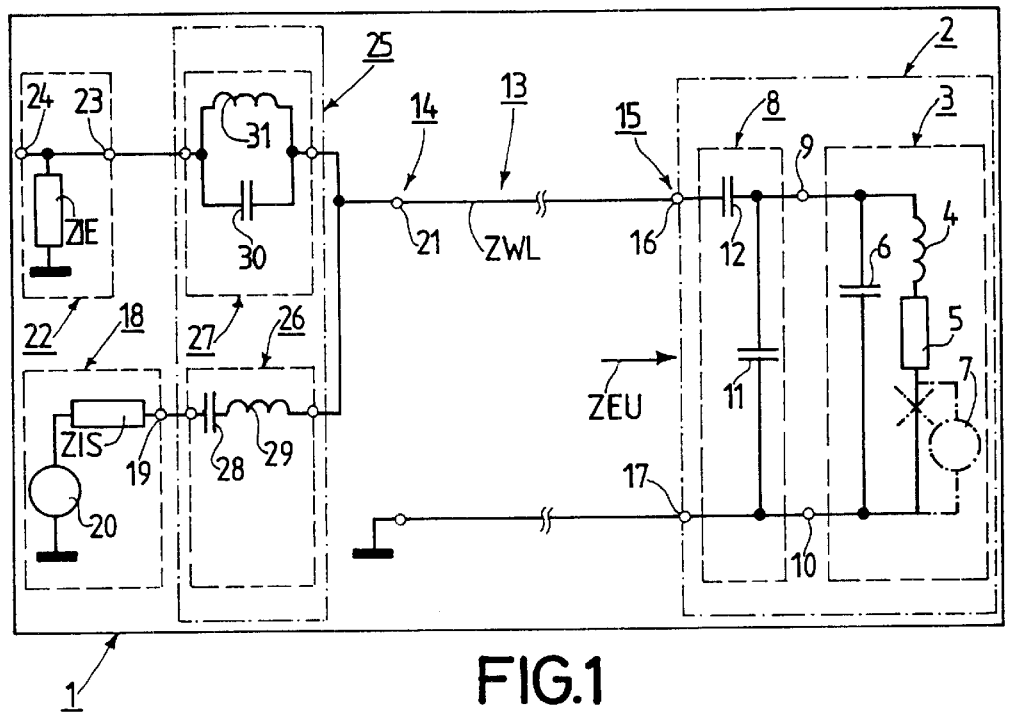
FIG. 1 is a diagrammatic representation in the form of a block diagram which shows the relevant part of a transmitting/receiving station in accordance with a first embodiment of the invention.

FIG. 1 shows a part of a transmitting/receiving station 1 in accordance with a first embodiment of the invention in a diagrammatic representation in the form of a block diagram with the aid of so-called equivalent diagrams. Hereinafter, the transmitting/receiving station 1 is briefly referred to as the station 1.

The station 1 is constructed to cooperate with a multitude of transponders, which each include a transponder transmission coil and which are each constructed to process a request signal upon reception of said request signal and to produce am answer signal in the station 1. The afore-mentioned measures are measures which are commonly known among experts, for which reason they are not described in further detail and for which reason FIG. 1 does not show such a transponder.

The station 1 can carry out a transmitting mode and a receiving mode, in which transmitting mode a request signal can be generated that can be transmitted to a transponder and in which receiving mode an answer signal produced in the station 1 by a transponder can be received and processed.

The station 1 includes a plurality of means of which FIG. 1 shows only those means which are relevant in the present context.

The station 1 includes a transmission coil circuit 2. The transmission coil circuit 2 includes a transmission coil 3 which serves for communicating with a transponder transmission coil provided in a transponder. As is apparent from the equivalent diagram of the transmission coil 3, the transmission coil 3 comprises an inductance 4, a resistance 5 in series with the inductance 4, and a capacitance 6 in parallel with the resistance 5. In a transmitting mode of the station 1 only the three afore-mentioned elements 4, 5 and 6 of the transmission coil 3 are active. In a receiving mode of the station 1 the transmission coil 3 in addition requires a voltage source 7, as is shown in dash-dot lines in FIG. 1. By substitution the voltage source 7 also represents the answer signal produced in the station 1 by a transponder.

The transmission coil circuit 2 further includes a matching network 8 connected to the transmission coil 3 via two terminals 9 and 10. The matching network comprises a first capacitor 11 arranged in parallel with the transmission coil 3 and a second capacitor 12 arranged in series with the transmission coil 3.

The station 1 further includes conductor means 13. The conductor means 13 are shown diagrammatically in FIG. 1. In the present case, the conductor means are formed by a coaxial cable of a given desired length, which has a characteristic impedance or surge impedance ZWL. In the present case, the characteristic impedance ZWL has a value of 50 ohms. The conductor means 13 have a first conductor end 14 and a second conductor end 15, hereinafter referred to as the first end 14 and the second end 15. At the location of its second end 15 the conductor means 13 are connected to the transmission coil circuit 2, i.e. to the matching network 8 of the transmission coil circuit 2, via respective terminals 16 and 17. The matching network 8 is designed and dimensioned in such a manner that the value of its input resistance ZEU corresponds to the characteristic impedance ZWL of the conductor means 13, i.e. also has a value of 50 ohms.

The station 1 further includes transmitting means 18 constructed to generate in a transmitting mode a request signal AFI which can be transmitted by means of the transmission coil 3 and can be received by a transponder, which request signal is supplied to an output 19 by the transmitting means 18. As viewed in the equivalent diagram, the transmitting means 18 comprise a voltage source and an internal resistance ZIS. The value of the internal resistance ZIS is advantageously selected to differ distinctly from the characteristic impedance ZWL of the conductor means 13, namely substantially smaller in the present case. In the present case the value of the internal resistance ZIS lies approximately between 2 ohms and 3 ohms. Owing to this choice of the value of the internal resistance ZIS it is achieved that a request signal is fed into the conductor means 13 with a maximal energy content and thus transferred to the transmission coil 3. The transmitting means 18 are connected to the conductor means 13 at the location of the first end 14 of the conductor means 13. For this purpose, as can be seen in FIG. 1, the output 19 of the transmitting means 18 is connected to a terminal 21 of the conductor means 13 at the location of the first end 14 of the conductor means 13.

It is to be noted that, in the present case, the transmitting means 18 are constructed to generate a request signal AFI which is essentially a modulated carrier signal which lies in a first frequency range FB1.

The station 1 further includes receiving means 22. The receiving means 22 are essentially constructed to receive an answer signal AWI produced in the station 1 by a transponder in response to a request signal AFI received by it. The receiving means 22 are also connected to the conductor means 13 at the location of the first end 14 of the conductor means 13. This is effected in such a manner that the receiving means 22 have an input 23 connected to the terminal 21 of the conductor means 13.

The receiving means 22—represented as an equivalent diagram purely for receiving operation—comprise an internal resistance ZIE, which may also be regarded as an input resistance. In the present case, the value of the internal resistance ZIE is selected to be substantially equal to that of the characteristic impedance ZWL of the conductor means 13, the internal resistance ZIE having a value of, for example, 30 ohms to 40 ohms. Thus, for an answer signal AWI produced in the station 1 the receiving means 22 have an internal resistance ZIE whose value lies close to the characteristic impedance ZWL of the conductor means 13. This is very advantageous because this enables an answer signal produced in the station 1 and transferred to the receiving means 22 via the conductor means 13 to be transmitted to the receiving means 22 and to be received by the receiving means 22 substantially without any loss of power.

It is to be noted that in the present case the receiving means 122 are constructed to receive an answer signal AWI which is also formed by a modulated carrier signal which lies in a second frequency range FB2 which does not overlap the first frequency range FB1.

It is to be noted further that an answer signal AWI received by the receiving means 22 is transferred to further means of the station 1 via an output 24 of the receiving means 22 in order to be subjected to a further processing and evaluation by these further means. This further processing and evaluation of an answer signal AWI is not discussed any further here because this is not relevant in the present context.

The station 1 advantageously includes additional means 25 between the transmitting means 18 and the receiving means 22 and the first end 14 of the conductor means 13. The additional means 25 connect the transmitting means 18 and the receiving means 22 to the first end 14 of the conductor means 13. The implementation of the additional means 25 ensures that the first end 14 of the conductor means 13 has a matched termination for an answer signal AWI produced in the station 1. The implementation or circuit design of the additional means in the present case of the station 1 shown in FIG. 1 is such that the additional means 25 include first filter means 26 and second filter means 27. Of the filter means 26 and 27 the first filter means 26 are arranged between the transmitting means 18 and the first end 14 of the conductor means 13. Of the filter means 26 and 27 the second filter means 27 are arranged between the receiving means 22 and the first end 14 of the conductor means 13.

In the present case, the first filter means 26 are formed by a band-pass filter. The first filter means 26 are constructed to allow the passage of a request signal AFI generated by the receiving means 18 and to reject an answer signal AWI to be received by the receiving means 22. It is to be noted that in practice a rejection of a signal is not a complete suppression of this signal but a string attenuation of this signal in such a manner that the attenuated signal cannot have any undesired effects and influences. Then first filter means 26 comprise the series arrangement of a first filter capacitor 28 and a first filter inductance 29.

In the present case the second filter means 27 are formed by a band-stop circuit. The second filter means 27 are constructed to allow the passage of an answer signal AWI and to reject a request signal AFI. The second filter means 27 comprise a parallel arrangement of a second filter capacitor 30 and a second filter inductance 31.

As a result of the provision of the request signal 25 described hereinbefore in the station 1 shown in FIG. 1 it is achieved in a very simple manner that the first end 14 of the conductor means 13 has a matched termination for an answer signal AWI produced in the station 1. This always guarantees a correct matching of the second end 15 of the conductor means 13 to the transmission coil circuit 2 for an answer signal AWI produced in the station 1, which yields the advantage that altogether an answer signal AWI which is produced in the station 1 by a transponder - and which, in the equivalent diagram, is supplied by the voltage source 7 is always transmitted with substantially its full energy content to the receiving means 22 of station 1 via the matching network 8, the conductor means 13 and the second filter means 22, as a result of which always an answer signal AWI having an advantageously high energy content is put at the disposal of the receiving means 22.

Figure 2:
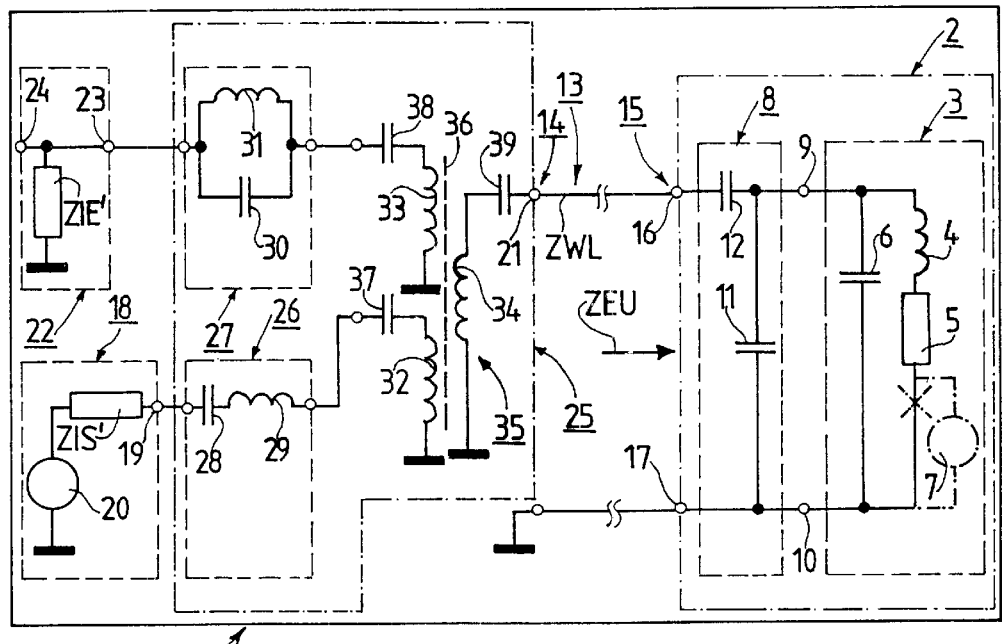
FIG. 2 in the same way as FIG. 1, shows a transmitting/ receiving station in accordance with a second embodiment of the invention.

The station 1 shown in FIG. 2 in accordance with the invention is an advantageous variant of the station shown in FIG. 1. For this reason only those characteristic features of the station 1 shown in FIG. 2 which differ from those of the station 1 shown in FIG. 1 will be described hereinafter.

In the station 1 shown in FIG. 1 a first transformer coil 32 is connected to the first filter means 26, a second transformer coil 33 is connected to the second filter means 27, and a third transformer coil 34 is connected to the first end 14 of the conductor means 13, i.e. to the terminal 21 of the conductor means 13. The first transformer coil 32, the second transformer coil 33 and the third transformer coil 34 belong to a matching transformer 35, which forms part of the additional means 25. In the matching transformer 35 the first transformer coil 32, the second transformer coil 33 and the third transformer coil 34 are inductively coupled to one another. For coupling the first transformer coil 32, the second transformer coil 33 and the third transformer coil 34 the matching transformer 35 in the present case comprises a ferrite core 36, which is shown only diagrammatically by means of a dash-dot line in FIG. 2 and around which the three transformer coils 32, 33 and 34 are wound. The ferrite core provides an intimate inductive coupling of the three transformer coils 32, 33 and 34.

In the station 1 shown in FIG. 2 a respective compensating capacitor 37, 38 or 39 is arranged in series with each of the three transformer coils 32, 33 and 34. The use of the compensating capacitors 37, 38 and 39 has proved to be very advantageous in such a station 1. It is to be noted, however, that the use of such compensating capacitors is known per se. Furthermore, it is to be noted that in practice the compensating capacitor 37, which is arranged in series with the first transformer coil 32, and the filter capacitor 28 of the first filter means 26 can alternatively be formed by a single capacitor.

In the station 1 shown in FIG. 2 the receiving means 22 have an internal resistance ZIE', which is advantageously matched to the characteristic impedance ZWL of the conductor means 13 by means of the matching transformer 35, i.e. by means of the second transformer coil 33 and the third transformer coil 34 of the matching transformer 35. The internal resistance ZIE' of the receiving means 22 can have a value of, for example, 300 ohms.

As regards the transmitting means 18 of the station 1 shown in FIG. 2 it is to be noted that said transmitting means 18 have an internal resistance ZIS', which can have a value of, for example, 2 ohms to 3 ohms.

The matching transformer 35 in the station 1 shown in FIG. 2 has the advantage that, by a suitable choice of the numbers of turns of the first transformer coil 32, of the second transformer coil 33 and of the third transformer coil 34, it is possible for the internal resistance ZIS' of the transmitting means 18 to have a resistance value which differs from the internal resistance ZIS of the transmitting means 18 of the station 1 shown in FIG. 1 and for the internal resistance ZIE' of the receiving means 22 to have a resistance value which differs from the internal resistance ZIE of the receiving means 22 of the station 1 shown in FIG. 1 but that nevertheless the matching transformer 35 enables these resistances to be matched to the characteristic impedance ZWL of the conductor means 13 in an optimum manner. Moreover, such a matching transformer 35 has the advantage that by a suitable choice of the numbers of turns of the three transformer coils 32, 33 and 34 the values of the components of the filter means 26 and 27 can come within ranges which enable the filter means 26 and 27 to be realized by means of commercially available and, consequently, low-cost components.

The invention is not limited to the two embodiments described hereinbefore by way of examples. The filter means 26 and 27 can alternatively be formed by other filter circuits, the use of more intricate filter circuits being also possible if this is required for an even better isolation between the transmitting means 18 and the receiving means 22. Moreover, if required, the matching network 8 of the transmission coil circuit 2, which matching network is connected to the conductor means 13, can have another and more intricate circuit design.

What is claimed is:

1. A transmitting/receiving station which is configured to cooperate with at least one transponder and by means of a which a transmitting mode and a receiving mode can be carried out and which comprises:

a transmission coil circuit comprising a transmission coil for the communication with a transponder transmission coil provided in a transponder;

conductor means having a given characteristic impedance, which conductor means have a first end and a second end and are connected to the transmission coil circuit at the location of the second end;

transmitting means which are configured to generate a request signal which in a transmitting mode can be transmitted by the transmission coil and can be received by the transponder and which are connected to the conductor means at the location of the first end of the conductor means;

receiving means which are configured to receive an answer signal produced in the transmitting/receiving station in response to a request signal received by the transponder and which are connected to the conductor means at the location of the first end of the conductor means; and additional means which are interposed between the transmitting means and the receiving means and the first end of the conductor means, by which additional means the transmitting means and the receiving means are connected to the first end of the conductor means and by which additional means the first end of the conductor means has a matched termination for the answer signal produced in the transmitting/receiving station.

2. A transmitting/receiving station as claimed in claim 1, wherein the transmitting means are configured to generate the request signal which is essentially formed by a first modulated carrier signal which lies in a first frequency range, and the receiving means are configured to receive an answer signal which is essentially formed by a second modulated carrier signal and which lies in a second frequency range which does not overlap the first frequency range, the additional means comprising first filter means and second filter means, of which the first filter means are interposed between the transmitting means and the first end of the conductor means and of which the second filter means are interposed between the receiving means and the first end of the conductor means, and the first filter means are configured to transfer the request signal and to reject the answer signal, and the second filter means are configured to transfer the answer signal and to reject the request signal.

3. A transmitting/receiving station as claimed in claim 2, wherein the first filter means are formed by a band-pass filter and the second filter means are formed by a band-stop filter.

4. A transmitting/receiving station as claimed in claim 2, wherein a first transformer coil is connected to the first filter means, a second transformer coil is connected to the second filter means, and a third transformer coil is connected to the first end of the conductor means, and the first transformer coil, the second transformer coil and the third transformer coil belong to a matching transformer, in which the first transformer coil, the second transformer coil and the third transformer coil are inductively coupled to one another.

5. A transmitting/receiving station as claimed in claim 4, wherein the matching transformer comprises a ferrite core for coupling the first transformer coil, the second transformer coil and the third transformer coil, around which ferrite core the three transformer coils are wound.

6. A transmitting/receiving station as claimed in claim 4, wherein each of the three transformer coils is arranged in series with a respective compensating capacitor.

* * * * *